(12) United States Patent
Bang (10) Patent No.: US 7,824,798 B2
(45) Date of Patent: Nov. 2, 2010

(54) SECONDARY BATTERY

(75) Inventor: Sun-Hee Bang, Busan-Si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1045 days.

(21) Appl. No.: 11/188,209

(22) Filed: Jul. 25, 2005

(65) Prior Publication Data

US 2006/0040179 A1 Feb. 23, 2006

(30) Foreign Application Priority Data

Jul. 30, 2004 (KR) .................. 10-2004-0060084
Jul. 30, 2004 (KR) .................. 10-2004-0060086
Jul. 30, 2004 (KR) .................. 10-2004-0060087

(51) Int. Cl.
H01M 2/06 (2006.01)
H01M 2/26 (2006.01)

(52) U.S. Cl. ...................... 429/178; 428/181

(58) Field of Classification Search ................ 429/178, 429/181
See application file for complete search history.

(56) References Cited

U.S. PATENT DOCUMENTS

| 2002/0034680 | A1* | 3/2002 | Inoue et al. ............. 429/94 |
| 2004/0126651 | A1* | 7/2004 | Kim et al. .............. 429/61 |
| 2006/0057457 | A1 | 3/2006 | Bang |
| 2007/0026302 | A1 | 2/2007 | Yoon |
| 2007/0154796 | A1 | 7/2007 | Uh |
| 2007/0154798 | A1 | 7/2007 | Jung |

FOREIGN PATENT DOCUMENTS

| CN | 1495933 | 5/2004 |
| JP | 11245043 A * | 9/1999 |
| JP | 2002-008623 | 1/2002 |
| JP | 2002-157992 | 5/2002 |
| JP | 2002-208395 | 7/2002 |
| JP | 2003-217562 | 7/2003 |
| JP | 2003-317678 | 11/2003 |
| KR | 10-2003-0066243 | 8/2003 |

OTHER PUBLICATIONS

Emboss definition—Dictionary—MSN Encarta: http://encarta.msn.com/encnet/features/dictionary.
Emboss—Dictionary definition and pronunciation—Yahoo!Education ettp://education.yahoo.com/reference/dictionary/entry/emboss.
Principal Metals: http://www.principalmetal.com/glossary/edoc.htm.
IPDL JPO Machine Translation for JP 2002008623 A (Higo et al.) Jan. 2002.

* cited by examiner

*Primary Examiner*—Gregg Cantelmo
(74) *Attorney, Agent, or Firm*—Robert E. Bushnell, Esq.

(57) ABSTRACT

A secondary battery includes: an electrode assembly having positive and negative electrode plates, a separator, and positive and negative electrode tabs respectively attached to the positive and negative electrode plates; and a cap assembly having a cap plate, an electrode terminal, and a terminal plate. The terminal plate has a protrusion arranged between a side thereof having a terminal through-hole contained therein to which the electrode terminal is attached and the other side.

48 Claims, 9 Drawing Sheets

SECONDARY BATTERY

CLAIM OF PRIORITY

This application makes reference to, incorporates the same herein, and claims all benefits accruing under 35 U.S.C. §119 from three applications for SECONDARY BATTERY, earlier filed in the Korean Intellectual Property Office on 30 Jul. 2004 and there duly assigned Serial Nos. 2004-60084, 2004-60086 and 2004-60087, respectively.

CROSS-REFERENCE TO RELATED APPLICATIONS

Furthermore, the present application is related to a co-pending U.S. application Ser. No. 11/188,213 entitled SECONDARY BATTERY, based upon Korean Patent Application Serial No. 2004-60085 filed in the Korean Intellectual Property Office on 30 Jul. 2004, and filed in the U.S. Patent & Trademark Office concurrently with the present application on the $25^{th}$ of Jul. 2005.

BACKGROUND OF THE INVENTION

1. Field of the Invention

The present invention relates to a secondary battery, and more particularly to a secondary battery having a protrusion formed on a terminal plate of a cap assembly for increased contact resistance during contact with a negative electrode tab and for easy welding of the negative electrode tab.

2. Description of the Related Art

As portable wireless appliances including video cameras, portable telephones, and portable computers tend to have reduced weight while incorporating more functions, much research has been conducted on secondary batteries which are used as the driving power source thereof. For example, secondary batteries include nickel cadmium batteries, nickel hydrogen batteries, nickel zinc batteries, and lithium secondary batteries. Among them, lithium secondary batteries are widely used in the cutting-edge electronic appliance field because they can be recharged, they can be made in a compact size while having larger capacity, and they have high operating voltage and high energy density per unit weight.

A secondary battery is formed by placing an electrode assembly, which is composed of positive and negative secondary electrode plates and a separator, into a can together with an electrode and sealing a top opening of the can with a cap assembly.

The electrode assembly is formed by winding the positive and negative electrode plates with the separator interposed between them. The positive electrode plate has a positive electrode tab attached thereto while protruding from the upper end of the electrode assembly. The negative electrode plate has a negative electrode tab attached thereto while protruding from the upper end of the electrode assembly. The positive and negative electrode tabs are spaced a predetermined distance from each other in the electrode assembly for electrical insulation between them. The positive and negative electrode tabs are generally formed of a nickel-based metal.

The cap assembly includes a cap plate, an insulation plate, a terminal plate, and an electrode terminal. After being attached to a separate insulation case, the cap assembly is attached to the top opening of the can and seals the can.

The cap plate is formed of a metal plate having a size and a shape corresponding to those of the top opening of the can. The cap plate has a first terminal through-hole formed at the center thereof, into which the electrode terminal is inserted. When the electrode terminal is inserted into the first terminal through-hole, a tube-type gasket tube is attached to the outer surface of the electrode terminal and is inserted together, in order to insulate the electrode terminal and the cap plate from each other. The cap plate has an electrolyte injection hole formed on a side thereof. After the cap assembly is assembled to the top opening of the can, an electrolyte is injected through the electrolyte injection hole, which is then sealed by a separate sealing means.

The electrode terminal is connected to the negative electrode tab of the negative electrode plate or to the positive electrode tab of the positive electrode plate and acts as a negative or positive terminal.

The insulation plate is formed of an insulation material such as a gasket and is attached to the lower surface of the cap plate. The insulation plate has a second terminal through-hole formed thereon, which is positioned to correspond to the first terminal through-hole of the cap plate, so that the electrode terminal can be inserted therein. The insulation plate has a seating groove formed on the lower surface thereof with a size corresponding to that of the terminal plate so that the terminal plate can be seated thereon.

The terminal plate is formed of a nickel steel alloy (34-37% of Ni and balance of Fe), which is a nickel-based alloy, and is positioned on the lower surface of the insulation plate. The terminal plate has a third terminal through-hole formed thereon, which is positioned to correspond to the first terminal through-hole of the cap plate, so that the electrode terminal can be inserted therein. The terminal plate is electrically connected the electrode terminal while being insulated from the cap plate, because the electrode terminal is insulated by the gasket tube as it extends through the first terminal through-hole of the cap plate.

The negative electrode tab which is attached to the negative electrode plate is welded to a side of the terminal plate and the positive electrode tab which is attached to the positive electrode plate is welded to the other side thereof. The negative and positive electrode tabs can be attached by resistance welding or laser welding, the resistance welding being preferred.

According to a recent method for reducing the internal resistance of secondary batteries, each component is formed of a metal having a low electrical resistance. In other words, the internal resistance of secondary batteries is reduced to avoid electrical loss within the batteries. Although the terminal plate is formed of a nickel steel alloy which has a high resistance, it is replaced by a nickel-based metal which has a low resistance to avoid electrical losses caused by high resistance.

When the terminal plate is formed of a nickel-based metal, however, the contact resistance between the terminal plate and the negative electrode tab decreases and it becomes difficult to weld the negative electrode tab. As such, the weldability between the terminal plate and the negative electrode tab deteriorates and the welding tends to be performed between the negative electrode tab and the welding rod.

SUMMARY OF THE INVENTION

Accordingly, the present invention has been made to solve the above-mentioned problems, and an object of the present invention is to provide a secondary battery having a protrusion formed on a terminal plate of a cap assembly for increased contact resistance during contact with a negative electrode tab and for easy welding of the negative electrode tab.

In order to accomplish this object, a secondary battery is provided comprising: an electrode assembly having positive and negative electrode plates, a separator, and positive and negative electrode tabs respectively attached to the positive and negative electrode plates; and a cap assembly having a cap plate, an electrode terminal, and a terminal plate; the terminal plate has a protrusion arranged between a side thereof having a terminal through-hole contained therein to which the electrode terminal is attached and the other side.

The negative electrode tab is preferably attached to the protrusion by welding.

The protrusion preferably comprises at least one protuberance arranged between the side having the terminal through-hole contained therein to which the electrode terminal is attached and the other side.

The protrusion alternatively preferably comprises at least one protuberance displaced from a center of the terminal plate toward the terminal through-hole.

The protuberance alternatively preferably comprises at least one embossing impressed from the rear surface of the terminal plate. The protuberance preferably has a length at least 50% of a length of the terminal plate. The protuberance preferably has a shape of a circle, an ellipse, or a polygon. The protuberance preferably has a width less than 30% of a width of the negative electrode tab. The protuberance alternatively preferably has a width less than 25% of a width of the negative electrode tab. The protuberance preferably has a width of 1.0 mm or less. The protuberance preferably comprises at least two embossings arranged linearly or in a matrix array.

The at least two embossings are preferably spaced apart from each other by a distance greater than the width of the at least one embossing. The at least two embossings are preferably spaced apart from each other by at least 1.0 mm. The at least two embossings are preferably positioned adjacent to each other.

The protuberance preferably comprises a conductive tip attached to a front surface of the terminal plate. The conductive tip preferably comprises metal having a higher electrical resistance than that of a nickel-based metal. The conductive tip preferably comprises a nickel steel alloy. The conductive tip preferably has a diameter of 1.0 mm or less.

The protrusion preferably comprises a conductive embossing plate attached to a front surface of the terminal plate. The embossing plate preferably comprises a metal having a higher electrical resistance than that of a nickel-based metal. The embossing plate preferably comprises a nickel steel alloy. Each embossing of the embossing plate preferably has a diameter of 1.0 mm or less and the embossings are spaced apart by at least 1.0 mm.

The protrusion alternatively preferably comprises at least one bar. The protrusion alternatively preferably comprises two bars arranged parallel to each other. The protrusion is alternatively preferably impressed from a rear surface of the terminal plate. The protrusion preferably has a length at least 50% of a length of the terminal plate. The bar of the protrusion preferably has a width of 1.0 mm or less. The bars of the protrusion are preferably spaced from each other by at least 1.0 mm.

The protrusion alternatively preferably comprises a conductive wire attached to a front surface of the terminal plate. The conductive wire preferably comprises a metal having a higher electrical resistance than that of a nickel-based metal. The conductive wire preferably comprises a nickel steel alloy. The conductive wire preferably has a width of 1.0 mm or less.

The protrusion alternatively preferably comprises a mesh plate attached to a front surface of the terminal plate. The mesh plate preferably comprises a metal having a higher electrical resistance than that of a nickel-based metal. The mesh plate preferably comprises a nickel steel alloy. The mesh plate preferably comprises conductive wires having a diameter of 1.0 mm or less and wherein the conductive wires are spaced apart by at least 1.0 mm.

BRIEF DESCRIPTION OF THE DRAWINGS

A more complete appreciation of the present invention, and any of the attendant advantages thereof, will be readily apparent as the present invention becomes better understood by reference to the following detailed description when considered in conjunction with the accompanying drawings in which like reference symbols indicate the same or similar components, wherein:

FIG. 3b is a sectional view taken along line A-A of FIG. 3a;

FIG. 7b is a sectional view taken along line B-B of FIG. 7a;

FIG. 9b is a sectional view taken along line C-C of FIG. 9a;

FIG. 11b is a sectional view taken along line D-D of FIG. 11a;

FIG. 13b is a sectional view taken along line E-E of FIG. 13a;

FIG. 14b is a sectional view taken along line F-F of FIG. 14a; and

DETAILED DESCRIPTION OF THE INVENTION

Figure 1:
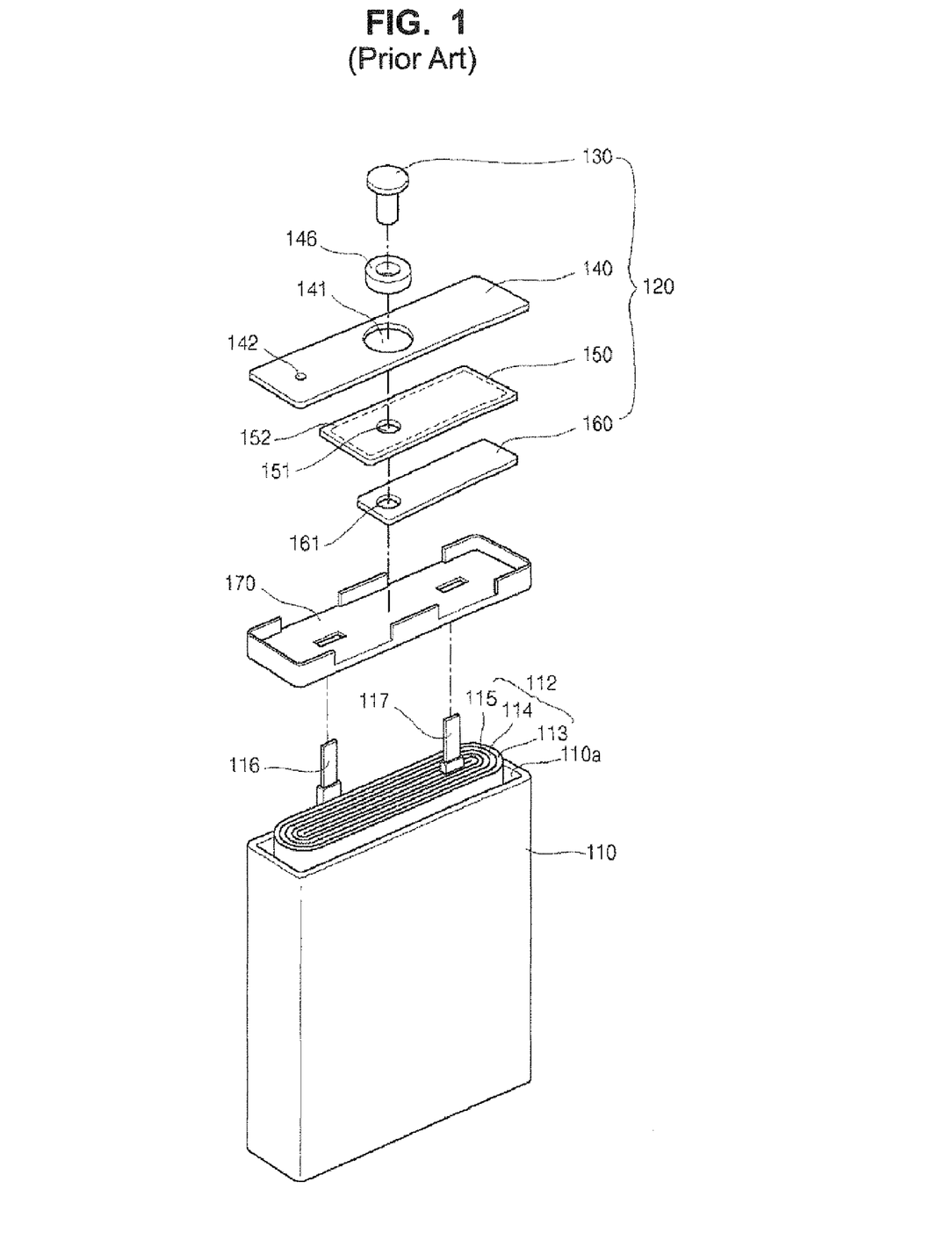
FIG. 1 is an exploded perspective view of a secondary battery.

FIG. 1 is an exploded perspective view of a secondary battery.

The secondary battery is formed by placing an electrode assembly 112, which is composed of positive and negative secondary electrode plates 113 and 115 and a separator 114, into a can 110 together with an electrode and sealing a top opening 110a of the can 110 with a cap assembly 120.

The electrode assembly 112 is formed by winding the positive and negative electrode plates 113 and 115 with the separator 114 interposed between them. The positive electrode plate 113 has a positive electrode tab 116 attached thereto while protruding from the upper end of the electrode assembly 112. The negative electrode plate 15 has a negative electrode tab 117 attached thereto while protruding from the upper end of the electrode assembly 112. The positive and negative electrode tabs 116 and 117 are spaced a predetermined distance from each other in the electrode assembly 112 for electrical insulation between them. The positive and negative electrode tabs 116 and 117 are generally formed of a nickel-based metal.

The cap assembly 120 includes a cap plate 140, an insulation plate 150, a terminal plate 160, and an electrode terminal 130. After being attached to a separate insulation case 170, the cap assembly 120 is attached to the top opening 110a of the can and seals the can 110.

The cap plate 140 is formed of a metal plate having a size and a shape corresponding to those of the top opening 110a of the can 110. The cap plate 140 has a first terminal through-hole 141 formed at the center thereof, into which the electrode terminal 130 is inserted. When the electrode terminal 130 is inserted into the first terminal through-hole 141, a tube-type gasket tube 146 is attached to the outer surface of the electrode terminal 130 and is inserted together, in order to insulate the electrode terminal 130 and the cap plate 140 from each other. The cap plate 140 has an electrolyte injection hole 142 formed on a side thereof. After the cap assembly 120 is assembled to the top opening 110a of the can 110, an electrolyte is injected through the electrolyte injection hole 142, which is then sealed by a separate sealing means.

The electrode terminal 130 is connected to the negative electrode tab 117 of the negative electrode plate 115 or to the positive electrode tab 116 of the positive electrode plate 113 and acts as a negative or positive terminal.

The insulation plate 150 is formed of an insulation material such as a gasket and is attached to the lower surface of the cap plate 140. The insulation plate 150 has a second terminal through-hole 151 formed thereon, which is positioned to correspond to the first terminal through-hole 141 of the cap plate 140, so that the electrode terminal 130 can be inserted therein. The insulation plate 150 has a seating groove 152 formed on the lower surface thereof with a size corresponding to that of the terminal plate 160 so that the terminal plate 160 can be seated thereon.

The terminal plate 160 is formed of a nickel steel alloy (34-37% of Ni and balance of Fe), which is a nickel-based alloy, and is positioned on the lower surface of the insulation plate 150. The terminal plate 160 has a third terminal through-hole 161 formed thereon, which is positioned to correspond to the first terminal through-hole 141 of the cap plate 140, so that the electrode terminal 130 can be inserted therein. The terminal plate 160 is electrically connected the electrode terminal 130 while being insulated from the cap plate 140, because the electrode terminal 130 is insulated by the gasket tube 146 as it extends through the first terminal through-hole 141 of the cap plate 140.

The negative electrode tab 117 which is attached to the negative electrode plate 115 is welded to a side of the terminal plate 160 and the positive electrode tab 116 which is attached to the positive electrode plate 113 is welded to the other side thereof. The negative and positive electrode tabs 117 and 116 can be attached by resistance welding or laser welding, the resistance welding being preferred.

Hereinafter, exemplary embodiments of the present invention are described with reference to the accompanying drawings. In the following description and drawings, the same reference numerals are used to designate the same or similar components, and so repetition of the description on the same or similar components has been omitted.

Figure 2:
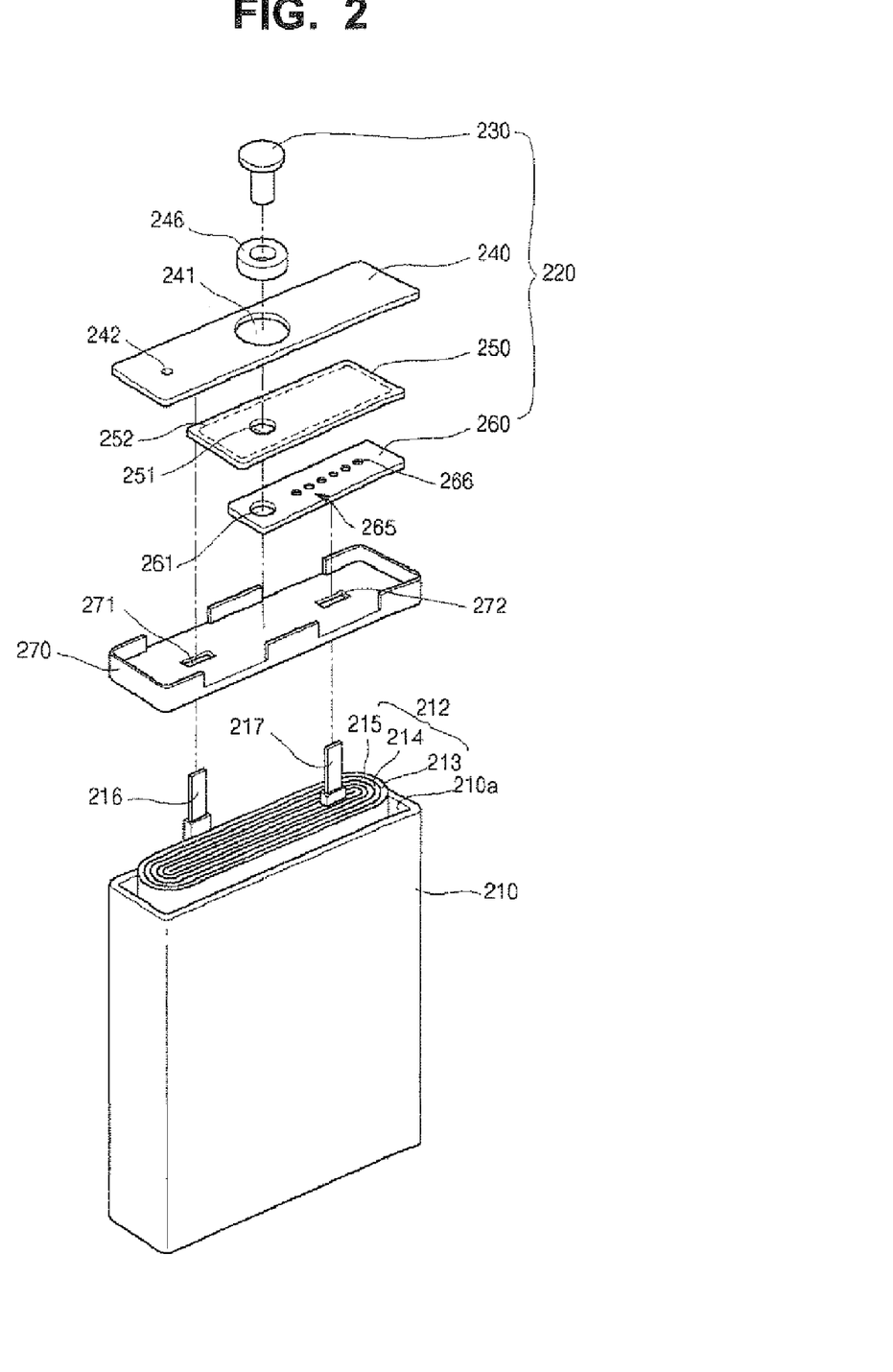
FIG. 2 is an exploded perspective view of a secondary battery according to an embodiment of the present invention.
Figure 3A:
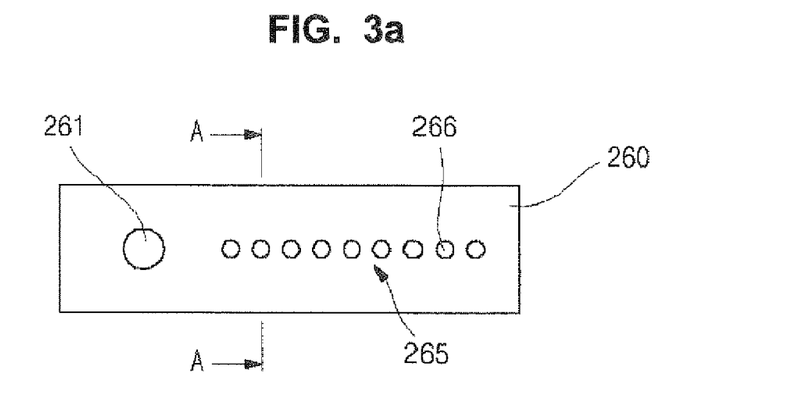
FIG. 3a is a bottom view of a terminal plate according to an embodiment of the present invention.
Figure 3B:
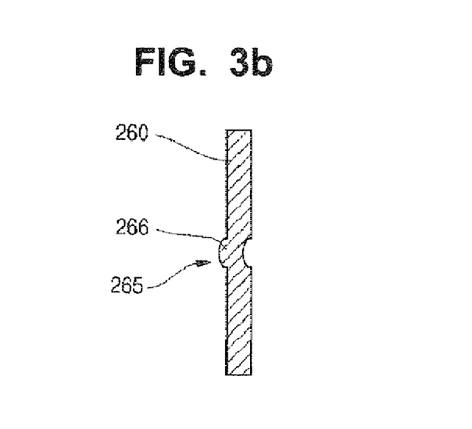
Figure 4:
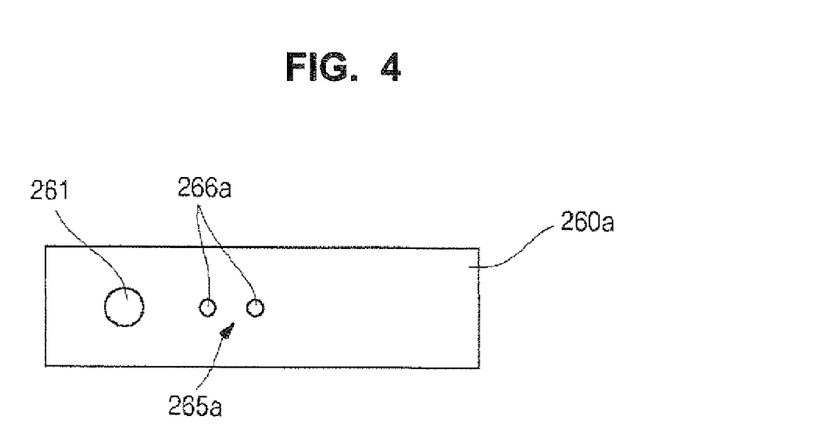
FIG. 4 is a bottom view of a terminal plate according to another embodiment of the present invention.
Figure 5:
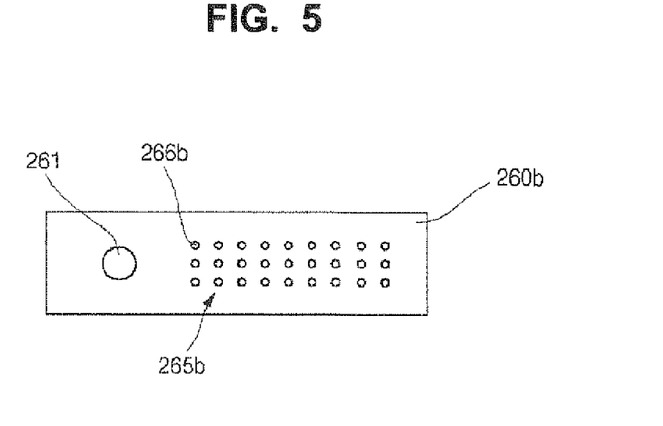
FIG. 5 is a bottom view of a terminal plate according to another embodiment of the present invention.
Figure 6:
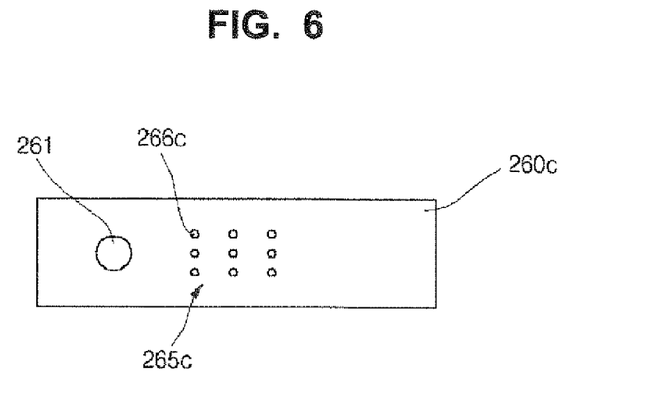
FIG. 6 is a bottom view of a terminal plate according to another embodiment of the present invention.
Figure 7A:
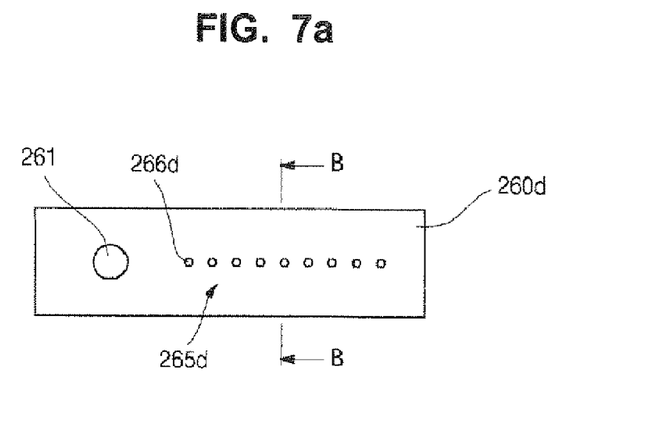
FIG. 7a is a bottom view of a terminal plate according to another embodiment of the present invention.
Figure 7B:
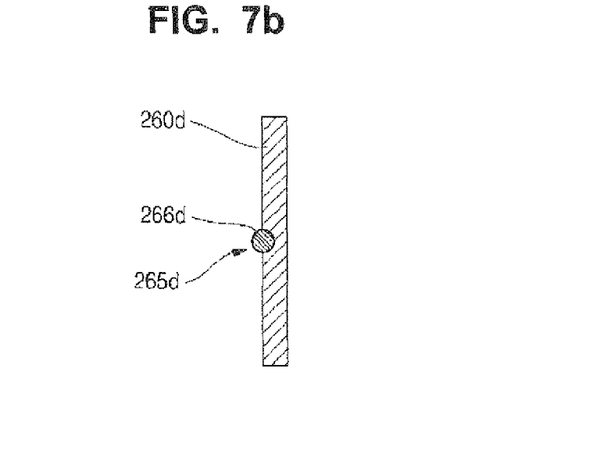
Figure 8:
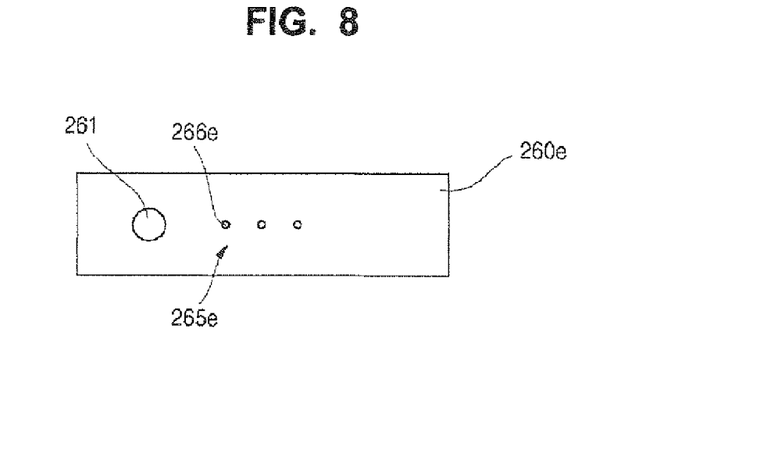
FIG. 8 is a bottom view of a terminal plate according to another embodiment of the present invention.
Figure 9A:
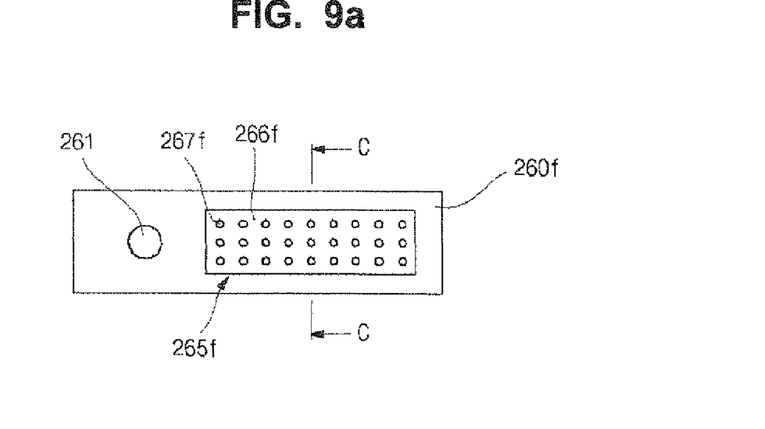
FIG. 9a is a bottom view of a terminal plate according to another embodiment of the present invention.
Figure 9B:
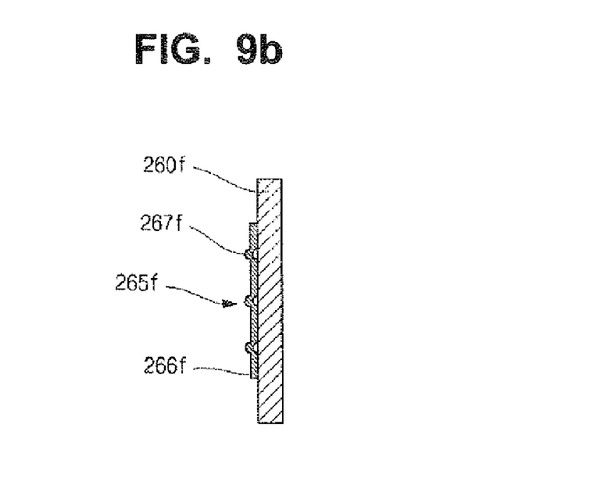
Figure 10:
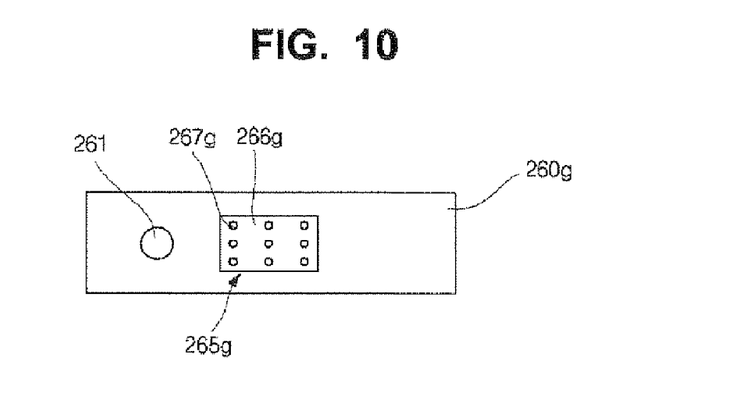
FIG. 10 is a bottom view of a terminal plate according to another embodiment of the present invention.
Figure 11A:
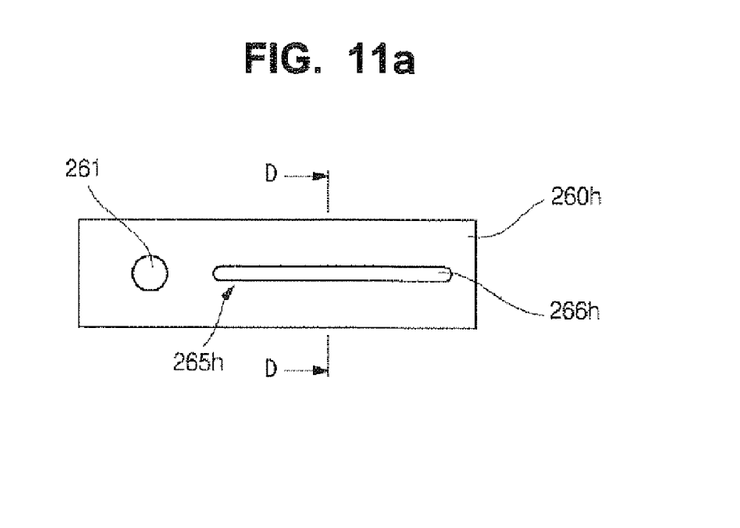
FIG. 11a is a bottom view of a terminal plate according to another embodiment of the present invention.
Figure 11B:
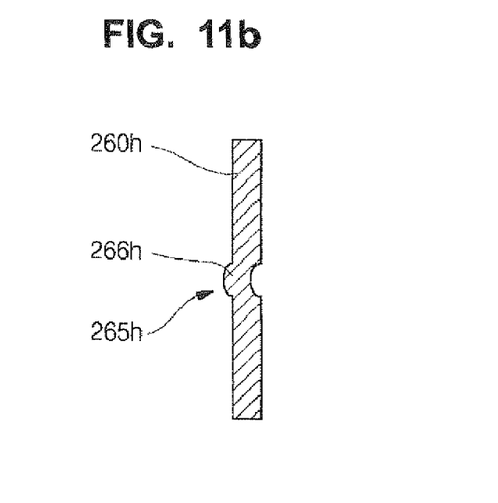
Figure 12:
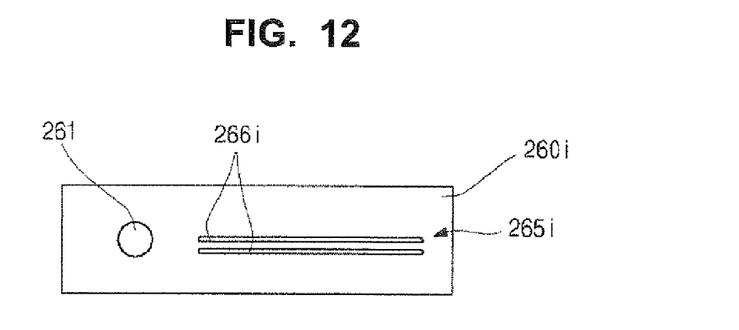
FIG. 12 is a bottom view of a terminal plate according to another embodiment of the present invention.
Figure 13A:
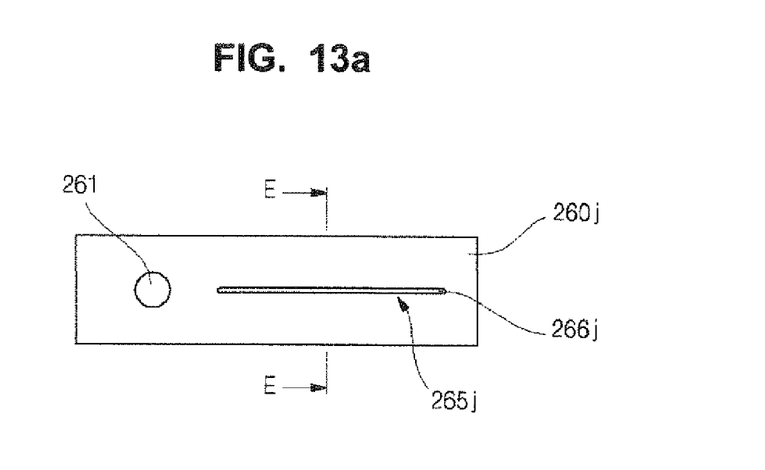
FIG. 13a is a bottom view of a terminal plate according to another embodiment of the present invention.
Figure 13B:
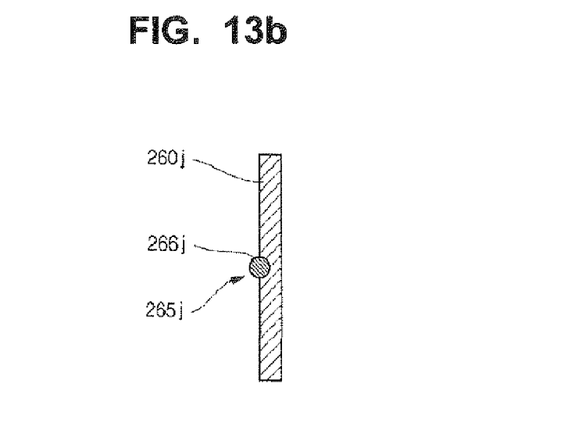
Figure 14A:
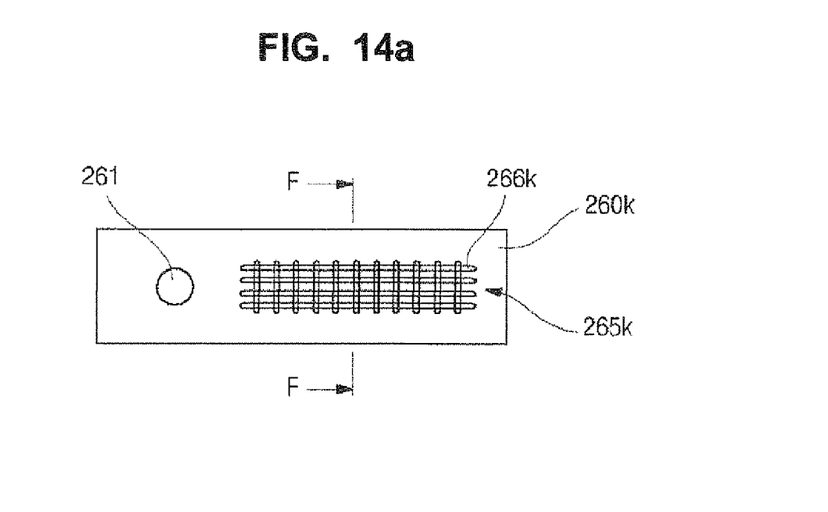
FIG. 14a is a bottom view of a terminal plate according to another embodiment of the present invention.
Figure 14B:
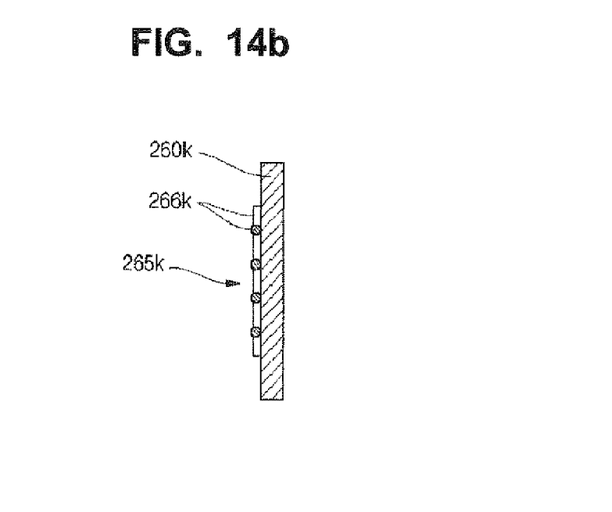
Figure 15:
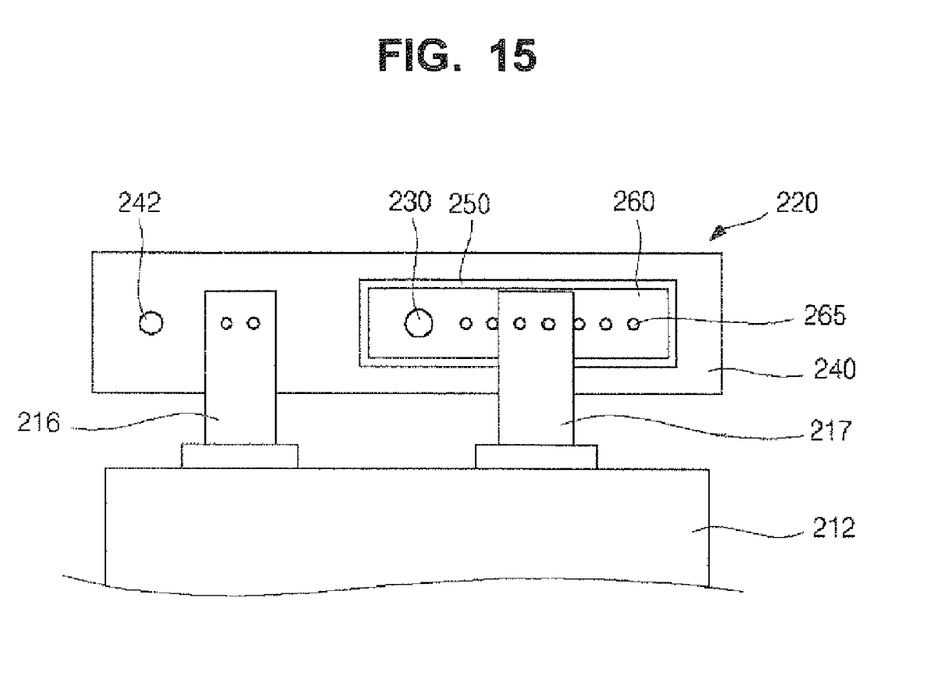
FIG. 15 is an assembled front view of a negative electrode tab and a terminal plate including a protrusion according to an embodiment of the present invention.

FIG. 2 is an exploded perspective view of a secondary battery according to an embodiment of the present invention; FIG. 3a is a bottom view of a terminal plate according to an embodiment of the present invention; FIG. 3b is a sectional view taken along line A-A of FIG. 3a; FIG. 4 is a bottom view of a terminal plate according to another embodiment of the present invention; FIG. 5 is a bottom view of a terminal plate according to another embodiment of the present invention; FIG. 6 is a bottom view of a terminal plate according to another embodiment of the present invention; FIG. 7a is a bottom view of a terminal plate according to another embodiment of the present invention; FIG. 7b is a sectional view taken along line B-B of FIG. 7a; FIG. 8 is a bottom view of a terminal plate according to another embodiment of the present invention; FIG. 9a is a bottom view of a terminal plate according to another embodiment of the present invention; FIG. 9b is a sectional view taken along line C-C of FIG. 9a; FIG. 10 is a bottom view of a terminal plate according to another embodiment of the present invention; FIG. 11a is a bottom view of a terminal plate according to another embodiment of the present invention; FIG. 11b is a sectional view taken along line D-D of FIG. 11a; FIG. 12 is a bottom view of a terminal plate according to another embodiment of the present invention; FIG. 13a is a bottom view of a terminal plate according to another embodiment of the present invention; FIG. 13b is a sectional view taken along line E-E of FIG. 13a; FIG. 14a is a bottom view of a terminal plate according to another embodiment of the present invention; FIG. 14b is a sectional view taken along line F-F of FIG. 14a; and FIG. 15 is an assembled front view of a negative electrode tab and a terminal plate including a protrusion according to an embodiment of the present invention.

Referring to FIG. 2, a secondary battery according to the present invention includes a can 210, an electrode assembly 212 contained in the can 210, and a cap assembly 220 for sealing a top opening 210a of the can 210.

The can 210 is a metallic member having a box shape and can serve as an electrical terminal. The can 210 is preferably formed of aluminum or an aluminum alloy, which is light and ductile. However, the present invention is not limited thereto. The can 210 has a top opening 210a with an open surface and the electrode assembly 212 is placed into the can 210 through the top opening 210a.

The electrode assembly 212 includes positive and negative electrode plates 213 and 215 and a separator 214. The positive and negative electrode plates 213 and 215 can be laminated with the separator 214 interposed between them and wound into a jelly roll. A positive electrode tab 216 is welded to the positive electrode plate 213 in such a manner that an end of the positive electrode tab 216 protrudes from the top of the electrode assembly 212. A negative electrode tab 217 is welded to the negative electrode plate 215 in such a manner that an end of the negative electrode tab 217 protrudes from the top of the electrode assembly 212.

The cap assembly 220 includes a cap plate 240, an insulation plate 250, a terminal plate 260, and an electrode terminal 230. The cam assembly 220 is attached to the top opening 210a of the can 210, while being insulated from the electrode assembly 212 by a separate insulation case 270, and seals the can 210.

The positive electrode tab 216 is connected to the cap plate 240 and the negative electrode tab 217 is connected to the terminal plate 260.

The can plate 240 is a metal plate having a size and a shape corresponding to those of the top opening 210a of the can 210. The cap plate 240 is preferably formed of aluminum or an aluminum alloy which is light. The cap plate 240 has a fourth terminal through-hole 241 formed at the center thereof and an electrolyte injection hole 242 positioned on a side thereof. The electrode terminal 230 is inserted into the fourth terminal through-hole 241. The fourth terminal through-hole 241 has a tube-type gasket tube 246 assembled to the inner surface thereof to insulate the electrode terminal 230 and the cap plate 240 from each other.

The electrolyte injection hole 242 is formed on a side of the cap plate 240. After the cap assembly 220 is assembled to the top opening 210a of the can 210, an electrolyte is injected through the electrolyte injection hole 242, which is then sealed by a separate sealing means.

The insulation plate 250 is formed of an insulation material such as a gasket and has a seating groove 252 formed on the lower surface thereof, on which the terminal plate 260 is seated. The insulation plate 250 has a fifth terminal through-hole 251 formed on a side thereof, which is positioned to correspond to the fourth terminal through-hole 241 of the cap plate 240 when the insulation plate 250 and the cap plate 240 are attached to each other, so that the electrode terminal 230 can be inserted therein.

Referring to FIGS. 3a and 3b, the terminal plate 260 is formed of a nickel-based metal and is attached to the seating groove 252 of the insulation plate 250. The terminal plate 260 has a sixth terminal through-hole 261 formed on a side thereof, which is positioned to correspond to the fourth terminal through-hole 241 of the cap plate 240, so that the electrode terminal 230 can be inserted therein.

The terminal plate 260 has a protrusion 265 formed between the sixth terminal through-hole 261 and the other side of the terminal plate 260 in a predetermined shape, and the negative electrode tab 217 is welded to the protrusion 265.

The protrusion 265 includes at least one protuberance 266 positioned between the sixth terminal through-hole 261 and the other side of the terminal plate 260. Each protuberance 266 has the shape of an embossing formed by impressing the rear surface of the terminal plate 260 as shown in FIGS. 3a and 3b. The protrusion 265 preferably includes two protuberances 266. Two protuberances 266 make the welding process easy, because the terminal plate 260 and the negative electrode tab 217 are welded to each other at two spots. Each protuberance 266 has a horizontal sectional shape of a circle, an ellipse, or a polygon and is formed by impressing the rear surface of the terminal plate 260. Each protuberance 266 has a diameter or width which is smaller than 30% of the width of the negative electrode tab 217, and preferably smaller than 25% of the width of the negative electrode tab 217. Since at least two protuberances 266 are preferably formed on a single negative electrode tab 217, the protuberances 266 must have a size which is smaller than 30% of the width of the negative electrode tab 217, considering the number and spacing of the protuberances 266.

Each protuberance 266 of the protrusion 265 can have a width or diameter of 1.0 mm or less. By using a nickel-based metal having low electrical resistance for the terminal plate 260, as mentioned above, low electrical resistance occurs during resistance welding of the negative electrode tab 217 to the terminal plate 260 and the welding is not easy. Therefore, the protrusion 265 reduces the contact area between the terminal plate 260 and the negative electrode tab 217 for increased electrical resistance in the contact region and easier resistance welding. Each protuberance 266 preferably has a width or diameter of 1.0 mm or less, in order to reduce the contact area between the terminal plate 260 and the negative electrode tab 217, because the welding rod used in resistance welding and the welded portion generally have a diameter of at least 1.0 mm.

The protrusion 265 is preferably formed in a region corresponding to at least 50% of the length of the terminal plate 260. If the region in which the protrusion 265 is formed is smaller than 50% of the length of the terminal plate 260, the negative electrode tab 217 must be welded with accurate positioning.

The protuberances 266 can be spaced apart from each other by a distance which is larger than the diameter or width of the protuberances 266. This is necessary when a distance must be secured between resistance welding rods, in order to weld the negative electrode tab 217 to the protuberances 266 of the terminal plate 260 by resistance welding.

The distance between each protuberance 266 can be at least 1 mm. This is because the negative electrode tab 217 is preferably welded to the terminal plate 260 at two spots and the diameter of the welded portion is at least 1.0 mm.

When the protuberances 266 are small, the contact area with the negative electrode tab 217 becomes small enough to position the protuberances 266 adjacent to each other.

The electrode terminal 230 is inserted through the fourth, fifth, and sixth terminal through-holes 241, 251, and 261 while being insulated by the gasket tube 246 and is attached to the cap plate 240, the insulation plate 250, and the terminal plate 260. The terminal plate 260 is electrically connected to the electrode terminal 230 in the cap assembly 220 while being insulated from the cap plate 240.

The insulation case 270 includes positive and negative electrode tab holes 271 and 272 and is attached to the lower portion of the cap assembly 220 to electrically insulate the cap assembly 220 and the electrode assembly 212 from each other. The positive electrode tab 216 is connected to the cap plate 240 through the positive electrode tab hole 271. The negative electrode tab 217 is connected to the terminal plate 260 through the negative electrode tab hole 272.

FIG. 4 is a bottom view of a terminal plate according to another embodiment of the present invention.

The terminal plate 260a has a protrusion 265a including at least one protuberance 266a formed thereon while being displaced toward the sixth terminal through-hole 261 from the center of the terminal plate 260a. The negative electrode tab 217 is welded to the protrusion 265. It is preferred to form two protuberances 266a, because the terminal plate 260a and the negative electrode tab 217 are welded to each other on at least two spots. By forming the protrusion 265a in such a manner that it is displaced toward the sixth terminal through-hole 261 from the center of the terminal plate 260a, the distance between the negative electrode tab 217 welded to the protrusion 265a and the electrode terminal 230 is reduced and the electrical resistance decreases accordingly. The contact resistance between the terminal plate 260a and the negative electrode tab 217 then increases and weldability improves. In addition, the electrical resistance between the negative electrode tab 217 and the electrode terminal 230 decreases and so does the internal resistance of the secondary battery.

FIG. 5 is a bottom view of a terminal plate according to another embodiment of the present invention.

Referring to FIG. 5, the terminal plate 260b has a protrusion 265b which includes a number of protuberances 266b formed as embossings between the sixth terminal through-hole 261 and the other side the terminal plate 260b in a matrix array. Specifically, the protrusion 265b is formed by arranging the protuberances 266b in at least two columns and rows. When the protuberances 266b are formed in a matrix array, the negative electrode tab 217 can be welded in a larger region and the welding process can be performed more easily. The protuberances 266b are preferably formed as embossings having a width or diameter which is less than 1.0 mm. The protuberances 266b must be spaced apart from one another by at least 1.0 mm. Otherwise, it is not easy to choose the welding position of the negative electrode tab 217 to the protrusion 265b, because the size of the welded portion created by resistance welding is at least 1.0 mm as mentioned above.

FIG. 6 is a bottom view of a terminal plate according to another embodiment of the present invention.

Referring to FIG. 6, the terminal plate 260c has a protrusion 265c which includes a number of protuberances 266c formed as embossings in a matrix array while being displaced toward the sixth terminal through-hole 261 from the center of the terminal plate 260c. Specifically, the protrusion 265c is formed by arranging the protuberances 266c in at least two columns and rows. When the protuberances 266c are formed in a matrix array, the negative electrode tab 217 can be welded in a larger region and the welding process can be performed more easily. The protuberances 266c preferably have a width or diameter of 1.0 mm or less. The protuberances 266c are spaced apart from one another by at least 1.0 mm.

FIGS. 7a and 7b are bottom and sectional views of a terminal plate according to another embodiment of the present invention.

Referring to FIGS. 7a and 7b, the terminal plate 260d has a protrusion 265d which includes at least one protuberance 266d formed as a conductive tip between the sixth terminal through-hole 261 and the other side the terminal plate 260d. The negative electrode tab 217 is welded to the protrusion 265d by resistance welding. Specifically, the protrusion 265d includes a number of protuberances 266d formed by attaching conductive tips to the terminal plate 260d. The conductive tips 266d are formed of a conductive substance in the shape of a sphere, an elliptical sphere, or a plate and preferably have a width or diameter of 1.0 mm or less. The conductive tips 266d are attached to the terminal plate 260d by pressing, welding, or soldering. The conductive tips 266d are preferably formed of a metal, such as a nickel steel alloy, having a higher electrical resistance than a nickel-based metal. However, the type of metal is not limited thereto. When the conductive tips 266d are formed of a metal having a higher electrical resistance than the nickel-based metal which constitutes the terminal plate 260d, the contact resistance further increases when the conductive tips 266d contact the negative electrode tab 217. This improves the resistance weldability.

The protuberances in the terminal plate can be conductive tips formed in a matrix array as shown in FIG. 5. The conductive tips are preferably spaced apart from one another by at least 1.0 mm.

FIG. 8 is a bottom view of a terminal plate according to another embodiment of the present invention.

Referring to FIG. 8, the terminal plate 260e has a protrusion 265e which includes a protuberance 266e formed by attaching at least one conductive tip in such a manner that it is displaced toward the sixth terminal through-hole 261 from the center of the terminal plate 260e. The negative electrode tab 217 is welded to the protrusion 265e by resistance welding. The conductive tip 266e is formed of a conductive substance in the shape of a sphere, an elliptical sphere, or a plate and preferably has a width or diameter of 1.0 mm or less. The conductive tip 266e is attached to the terminal plate 260e by pressing, welding, or soldering. The conductive tip 266e is preferably formed of a metal, such as a nickel steel alloy, having a higher electrical resistance than a nickel-based metal. However, the type of metal is not limited thereto. When the conductive tip 266e is formed of a metal having a higher electrical resistance than the nickel-based metal which constitutes the terminal plate 260e, the contact resistance further increases when the conductive tip 266e contacts the negative electrode tab 217. This improves the resistance weldability.

The protuberances in the terminal plate can be conductive tips formed in a matrix array as shown in FIG. 6. The conductive tips are preferably spaced apart from one another by at least 1.0 mm.

FIGS. 9a and 9b are bottom and sectional views of a terminal plate according to another embodiment of the present invention.

Referring to FIGS. 9a and 9b, the terminal plate 260f has a protrusion 265f formed by attaching an embossing plate 266f between the sixth terminal through-hole 261 and the other side of the terminal plate 260f. The negative electrode tab 217 is welded to the upper surface of the protrusion 265f by resistance welding. The embossing plate 266f is a thin plate having a number of embossings 267f formed on the surface thereof linearly or in a matrix array. The embossings 267f preferably have a width or diameter of 1.0 mm or less. The embossings 267f are preferably spaced apart from one another by at least 1.0 mm. The embossing plate 266f is preferably formed of a metal, such as a nickel steel alloy, having a higher electrical resistance than a nickel-based metal. However, the type of metal is not limited thereto. When the embossing plate 266f is formed of a metal having a higher electrical resistance than the nickel-based metal which constitutes the terminal plate 260f, the contact resistance further increases when the embossing plate 266f contacts negative electrode tab 217. This improves the resistance weldability. The embossing plate 266f is attached to the lower surface of the terminal plate 260f by welding, soldering, or gluing.

FIG. 10 is a bottom view of a terminal plate according to another embodiment of the present invention.

Referring to FIG. 10, the terminal plate 260g has a protrusion 265g formed by attaching an embossing plate 266g in such a manner that it is displaced toward the sixth terminal through-hole 261 from the center of the terminal plate 260g. The negative electrode tab 217 is welded to the upper surface of the embossing plate 266g by resistance welding. The embossing plate 266g is a thin plate having a number of embossings 267g formed on the surface thereof linearly or in a matrix array. The embossings 267g preferably have a width or diameter of 1.0 mm or less. The embossings 267g are preferably spaced apart from one another by at least 1.0 mm. The embossing plate 266g is preferably formed of a metal, such as a nickel steel alloy, having a higher electrical resistance than a nickel-based metal. However, the type of metal is not limited thereto. The embossing plate 266g is attached to the lower surface of the terminal plate 260g by welding, soldering, or gluing.

FIGS. 11a and 11b are bottom and sectional views of a terminal plate according to another embodiment of the present invention.

Referring to FIGS. 11a and 11b, the terminal plate 260h has a protrusion 265h which includes at least one bar 266h extending between the sixth terminal through-hole 261 and the other side of the terminal plate 260h. The negative electrode tab 217 is welded to the protrusion 265h. The bar 266h can be formed by impressing the rear surface of the terminal plate 260h. The bar 266h preferably has a length which corresponds to at least 50% of the length of the terminal plate 260h so that the negative electrode tab 217 can be easily positioned during welding. If the length of the bar 266h is smaller than 50% of the length of the terminal plate 260h, the negative electrode tab 217 must be accurately positioned during welding for an extended period of time. If the positioning is not accurate, the welding condition can deteriorate. The protrusion 265h preferably has the shape of a bar having a width of 1.0 mm or less so that the contact area between the terminal plate 260h and the negative electrode tab 217 decreases for increased electrical resistance in the contact region and for easy welding, because the welding rod used in resistance welding generally has a diameter of at least 1.0 mm.

FIG. 12 is a bottom view of a terminal plate according to another embodiment of the present invention.

Referring to FIG. 12, the terminal plate 260i has a protrusion 265i which includes preferably two bars 266i extending between the sixth terminal through-hole 261 and the other side of the terminal plate 260i. The bars 266i are formed by impressing the rear surface of the terminal plate 260i. When the protrusion 265i includes two bars 266i, the negative electrode tab 217 can be welded in a larger region and the welding becomes easy. The bars 266i preferably have a width of 1.0 mm or less and are positioned parallel to each other with a spacing of at least 1.0 mm between them. Since the welded portion has a size of at least 1.0 mm as mentioned above, the bars 266i must be spaced from each other by at least 1.0 mm so that the welded contact area decreases and the welding position of the negative electrode tab 217 with respect to the protrusion 265i can be easily chosen.

FIGS. 13a and 13b are bottom and sectional views of a terminal plate according to another embodiment of the present invention.

Referring to FIGS. 13a and 13b, the terminal plate 260j has a protrusion 265j which includes at least one conductive wire 266j extending between the sixth terminal through-hole 261 and the other side of the terminal plate 260j. The negative electrode tab 217 is welded to the protrusion 265j. The conductive wire 266j is a bar-type or plate-type conductive body having a sectional shape of a circle or square and preferably has a width or diameter of 1.0 mm or less. The conductive wire 266j is attached to the terminal plate 260j by welding, soldering, or gluing. The conductive wire 266j is preferably formed of a metal, such as a nickel steel alloy, having a higher electrical resistance than a nickel-based metal. However, the type of metal is not limited thereto. When the conductive wire 266j is formed of metal having a higher electrical resistance than the nickel-based metal which constitutes the terminal plate 260j, the contact resistance further increases, while the increase in the internal resistance is minimized, when the conductive wire 266j contacts negative electrode tab 217. This improves the resistance weldability.

The protrusion 265j can include at least two conductive wires 266j which are preferably spaced from each other at least 1.0 mm.

FIGS. 14a and 14b are bottom and sectional views of a terminal plate according to another embodiment of the present invention.

Referring to FIGS. 14a and 14b, the terminal plate 260k has a protrusion 265k formed by attaching a mesh plate 266k between the sixth terminal through-hole 261 and the other side of the terminal plate 260k. The negative electrode tab 217 is welded to the protrusion 265k. The mesh plate 266k is formed of conductive wires shaped into a mesh and the conductive wires preferably have a width or diameter of 1.0 mm or less. The conductive wires are preferably spaced apart from one another by at least 1.0 mm. The mesh plate 266k is attached to the terminal plate 260k by welding, soldering, or gluing. The mesh plate 266k is preferably formed of a metal, such as a nickel steel alloy, having a higher electrical resistance than a nickel-based metal. However, the type of metal is not limited thereto.

The operation of a secondary battery including a terminal plate having a protrusion formed thereon according to the present invention is described below.

FIG. 15 is a front view of a secondary battery having a negative electrode tab welded to terminal plate having a protuberance formed thereon according to the present invention.

The terminal plate 260 is seated on the lower surface of a cap plate 240 while being insulated by an insulation plate 250. The terminal plate 260 has an electrode terminal 230 attached to a side thereof. The terminal plate 260 has a protuberance 265 formed on the lower surface thereof, to which a negative electrode tab 217 of an electrode assembly 212 is welded by resistance welding. The protuberance 265 reduces the contact area between the negative electrode tab 217 and the terminal plate 260 while increasing the electrical resistance in the contact region. The resistance welding of the negative electrode tab 217 to the terminal plate 260 then can be performed more easily. After the negative electrode tab 217 is welded to the terminal plate 260, the positive electrode tab 216 is welded to the cap plate 240. The cap assembly 220 is assembled to the top opening 210a of the can 210 by bending the negative and positive electrode tab 217 and 216 with an angle of 90° in a predetermined position.

When the protuberance 265 is formed by a conductive tip or conductive embossing plate formed of metal having a higher electrical resistance than a nickel-based metal, the contact resistance between the terminal plate 260 and the negative electrode tab 217 increases and the weldability improves.

It is obvious to those skilled in the art that, although the operation of a secondary battery according to the present invention has been described with reference to a terminal plate 260 having a protrusion 265 which includes a protuberance formed by impressing the terminal plate 260 in a spot shape, the description can be equally applied to other embodiments having variously configured protrusions.

According to the inventive secondary battery, the terminal plate has a protrusion formed thereon and the negative electrode tab contacts to be welded to the protrusion. The contact area then decreases while the electrical resistance increases. This improves the resistance weldability.

In addition, the increase in the electrical resistance between the terminal plate and the negative electrode tab makes it possible to avoid welding between the negative electrode tab and the welding rod.

Although exemplary embodiments of the present invention have been described for illustrative purposes, those skilled in the art will appreciate that various modifications, additions and substitutions are possible, without departing from the scope and spirit of the invention as recited in the accompanying claims.

What is claimed is:

1. A secondary battery, comprising:
an electrode assembly having positive and negative electrode plates, a separator, and positive and negative electrode tabs respectively attached to the positive and negative electrode plates; and
a cap assembly having a cap plate, an electrode terminal, and a terminal plate;
wherein the terminal plate has a protrusion arranged between a side thereof having a terminal through-hole contained therein to which the electrode terminal is attached and the other side; and
wherein the protrusion comprises at least one protuberance including embossing and the protrusion is wider than the negative electrode tab to which the protrusion is welded.

2. The secondary battery as claimed in claim 1, wherein the negative electrode tab is attached to the protrusion by welding.

3. The secondary battery as claimed in claim 1, wherein the at least one protuberance is arranged between the side having the terminal through-hole contained therein to which the electrode terminal is attached and the other side.

4. The secondary battery as claimed in claim 1, wherein the at least one protuberance is displaced from a center of the terminal plate toward the terminal through-hole.

5. The secondary battery as claimed in claim 3, wherein the a shape of embossing is made by impressed from the rear surface of the terminal plate.

6. The secondary battery as claimed in claim 4, wherein the embossing of the at least one protuberance is impressed from the rear surface of the terminal plate.

7. The secondary battery as claimed in claim 4, wherein the at least one protuberance has a length at least 50% of a length of the terminal plate.

8. The secondary battery as claimed in claim 5, wherein the at least one protuberance has a shape of a circle, an ellipse, or a polygon.

9. The secondary battery as claimed in claim 5, wherein the at least one protuberance has a width less than 30% of a width of the negative electrode tab.

10. The secondary battery as claimed in claim 5, wherein the at least one protuberance has a width less than 25% of a width of the negative electrode tab.

11. The secondary battery as claimed in claim 5, wherein the at least one protuberance comprises at least two embossings arranged linearly or in a matrix array.

12. The secondary battery as claimed in claim 11, wherein the at least two embossings are spaced apart from each other by a distance greater than the width of the at least one embossing.

13. The secondary battery as claimed in claim 11, wherein the at least two embossings are spaced apart from each other by at least 1.0 mm.

14. The secondary battery as claimed in claim 11, wherein the at least two embossings are positioned adjacent to each other.

15. The secondary battery as claimed in claim 6, wherein the at least one protuberance has a shape of a circle, an ellipse, or a polygon.

16. The secondary battery as claimed in claim 6, wherein the at least one protuberance has a width less than 30% of a width of the negative electrode tab.

17. The secondary battery as claimed in claim 6, wherein the at least one protuberance has a width less than 25% of a width of the negative electrode tab.

18. The secondary battery as claimed in claim 6, wherein the at least one protuberance has a width of 1.0 mm or less.

19. The secondary battery as claimed in claim 6, wherein the at least one protuberance comprises at least two embossings arranged linearly or in a matrix array.

20. The secondary battery as claimed in claim 19, wherein the at least two embossings are spaced apart from each other by a distance greater than the width of either of the at least two embossings.

21. The secondary battery as claimed in claim 19, wherein the at least two embossings are spaced apart from each other by at least 1.0 mm.

22. The secondary battery as claimed in claim 19, wherein the at least two embossings are positioned adjacent to each other.

23. A secondary battery, comprising:
    an electrode assembly having positive and negative electrode plates, a separator, and positive and negative electrode tabs respectively attached to the positive and negative electrode plates; and
    a cap assembly having a cap plate, an electrode terminal, and a terminal plate;
    wherein the terminal plate has a protrusion arranged between a side thereof having a terminal through-hole contained therein to which the electrode terminal is attached and the other side;
    wherein the protrusion includes at least one protuberance arranged between the side having the terminal through-hole contained therein to which the electrode terminal is attached and the other side; and
    wherein the protuberance includes a conductive tip attached to a front surface of the terminal plate.

24. The secondary battery as claimed in claim 23, wherein the conductive tip comprises metal having a higher electrical resistance than that of a nickel-based metal.

25. The secondary battery as claimed in claim 23, wherein the conductive tip comprises a nickel steel alloy.

26. The secondary battery as claimed in claim 23, wherein the conductive tip has a diameter of 1.0 mm or less.

27. A secondary battery, comprising:
    an electrode assembly having positive and negative electrode plates, a separator, and positive and negative electrode tabs respectively attached to the positive and negative electrode plates; and
    a cap assembly having a cap plate, an electrode terminal, and a terminal plate;
    wherein the terminal plate has a protrusion arranged between a side thereof having a terminal through-hole contained therein to which the electrode terminal is attached and the other side;
    wherein the protrusion includes at least one protuberance displaced from a center of the terminal plate toward the terminal through-hole; and
    wherein the protuberance includes a conductive tip attached to a front surface of the terminal plate.

28. The secondary battery as claimed in claim 27, wherein the conductive tip comprises metal having a higher electrical resistance than that of a nickel-based metal.

29. The secondary battery as claimed in claim 27, wherein the conductive tip comprises a nickel steel alloy.

30. The secondary battery as claimed in claim 27, wherein the conductive tip has a diameter of 1.0 mm or less.

31. A secondary battery, comprising:
    an electrode assembly having positive and negative electrode plates, a separator, and positive and negative electrode tabs respectively attached to the positive and negative electrode plates; and
    a cap assembly having a cap plate, an electrode terminal, and a terminal plate;
    wherein the terminal plate has a protrusion arranged between a side thereof having a terminal through-hole contained therein to which the electrode terminal is attached and the other side; and
    wherein the protrusion includes a conductive embossing plate attached to a front surface of the terminal plate.

32. The secondary battery as claimed in claim 31, wherein the embossing plate comprises a metal having a higher electrical resistance than that of a nickel-based metal.

33. The secondary battery as claimed in claim 31, wherein the embossing plate comprises a nickel steel alloy.

34. The secondary battery as claimed in claim 31, wherein each embossing of the embossing plate has a diameter of 1.0 mm or less and the embossings are spaced apart by at least 1.0 mm.

35. A secondary battery, comprising:
- an electrode assembly having positive and negative electrode plates, a separator, and positive and negative electrode tabs respectively attached to the positive and negative electrode plates; and
- a cap assembly having a cap plate, an electrode terminal, and a terminal plate;
- wherein the terminal plate has a protrusion arranged between a side thereof having a terminal through-hole contained therein to which the electrode terminal is attached and the other side; and
- wherein the protrusion includes a mesh plate attached to a front surface of the terminal plate.

36. The secondary battery as claimed in claim 35, wherein the mesh plate comprises a metal having a higher electrical resistance than that of a nickel-based metal.

37. The secondary battery as claimed in claim 35, wherein the mesh plate comprises a nickel steel alloy.

38. The secondary battery as claimed in claim 35, wherein the mesh plate comprises conductive wires having a diameter of 1.0 mm or less and wherein the conductive wires are spaced apart by at least 1.0 mm.

39. A secondary battery, comprising:
- an electrode assembly having positive and negative electrode plates, a separator, and positive and negative electrode tabs respectively attached to the positive and negative electrode plates; and
- a cap assembly having a cap plate, an electrode terminal, and a terminal plate;
- wherein the terminal plate has a protrusion arranged between a side thereof having a terminal through-hole contained therein to which the electrode terminal is attached and the other side; and
- wherein the protrusion includes at least one bar.

40. The secondary battery as claimed in claim 39, wherein the protrusion comprises two bars arranged parallel to each other.

41. The secondary battery as claimed in claim 39, wherein the protrusion is impressed from a rear surface of the terminal plate.

42. The secondary battery as claimed in claim 39, wherein the protrusion has a length at least 50% of a length of the terminal plate.

43. The secondary battery as claimed in claim 39, wherein the bar of the protrusion has a width of 1.0 mm or less.

44. The secondary battery as claimed in claim 40, wherein the bars of the protrusion are spaced from each other by at least 1.0 mm.

45. The secondary battery as claimed in claim 39, wherein the protrusion comprises a conductive wire attached to a front surface of the terminal plate.

46. The secondary battery as claimed in claim 45, wherein the conductive wire comprises a metal having a higher electrical resistance than that of a nickel-based metal.

47. The secondary battery as claimed in claim 45, wherein the conductive wire comprises a nickel steel alloy.

48. The secondary battery as claimed in claim 45, wherein the conductive wire has a width of 1.0 mm or less.

* * * * *